Dec. 8, 1970  E. O. FORSTER  3,545,093
MICROWAVE VIBRATING RESONATING CAVITY AND DRYING PROCESS
Filed Dec. 23, 1968  3 Sheets-Sheet 1
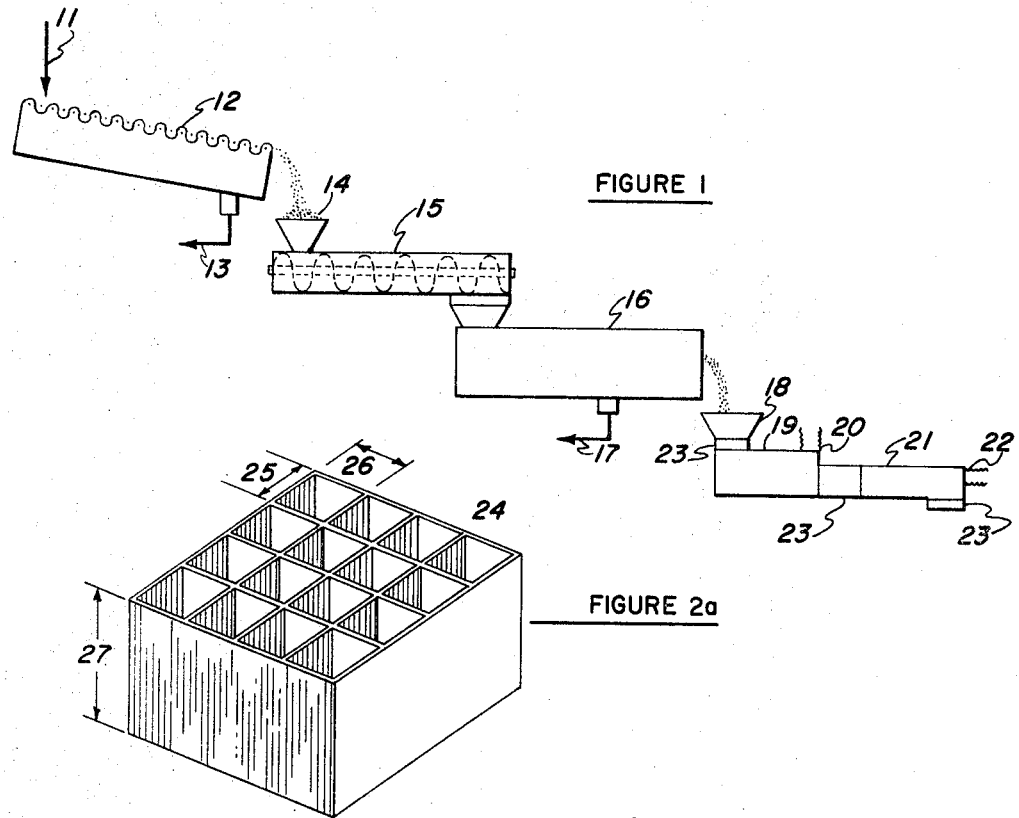
FIGURE 1
FIGURE 2a
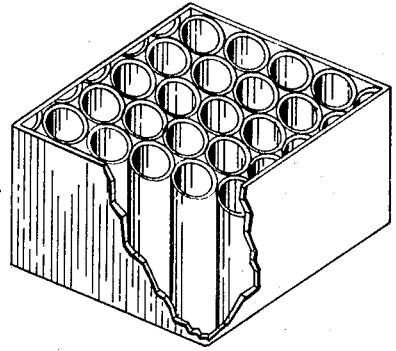
FIGURE 2b
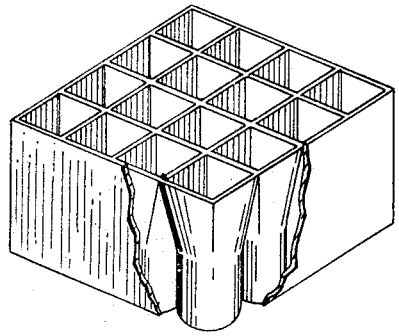
FIGURE 2c
E. O. Forster  Inventor
By Jack Matalon  Attorney

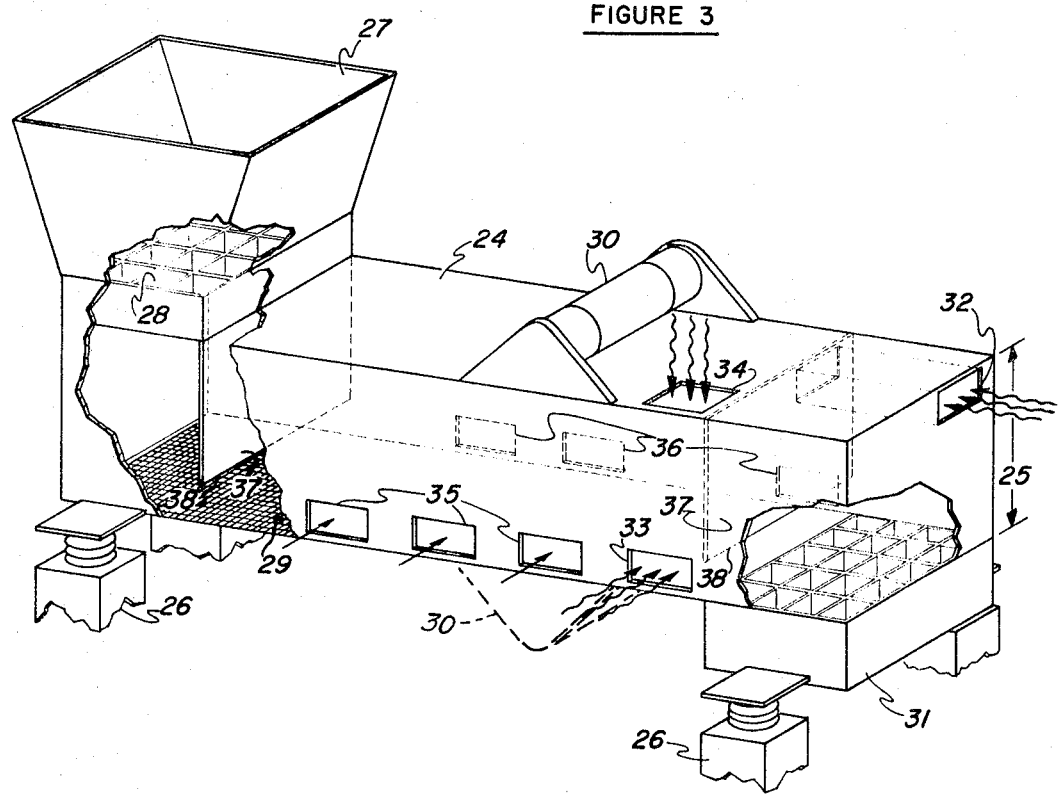

Dec. 8, 1970   E. O. FORSTER   3,545,093
MICROWAVE VIBRATING RESONATING CAVITY AND DRYING PROCESS
Filed Dec. 23, 1968   3 Sheets-Sheet 3

E. O. Forster   INVENTOR

BY Harold Einhorn ATTORNEY

United States Patent Office 3,545,093
Patented Dec. 8, 1970

3,545,093
MICROWAVE VIBRATING RESONATING
CAVITY AND DRYING PROCESS
Eric O. Forster, Scotch Plains, N.J., assignor to Esso
Research and Engineering Company, a corporation of
Delaware
Continuation-in-part of application Ser. No. 675,155,
Oct. 10, 1967. This application Dec. 23, 1968, Ser.
No. 785,982
Int. Cl. H05b 9/06
U.S. Cl. 34—1                                      20 Claims

ABSTRACT OF THE DISCLOSURE

A microwave resonating cavity comprising a vibrated enclosure having a height of about $\lambda/2$ to about $\lambda$, wherein $\lambda$ is the wave length of the microwaves being introduced into the cavity, is used to remove volatile polar vehicles from nonpolar materials. The equipment is operated at a microwave frequency of about 600 to about 50,000 mHz. and includes radiation suppressors at the inlet and outlet.

This vibrating resonating cavity is especially suitable for the drying of such polymers as butyl rubber, styrene butadiene, or polyvinyl chloride. The volatile content of such materials is readily reduced to 0.5 wt. percent, and where desired, to as low as less than 1 p.p.m.

CROSS-REFERENCE TO RELATED APPLICATIONS

This application is a continuation-in-part of U.S. patent application, S.N. 675,155, now U.S. Pat. No. 3,434,220, filed Oct. 10, 1967, issued Feb. 25, 1969.

BACKGROUND OF INVENTION

This invention relates to improved polymer processes. More specifically, it relates to improved devolatilizing and drying techniques utilizing microwave heating.

In conventional processes for making polymers, it is necessary to remove solvents and/or water from the polymer. For example, in the preparation of butyl rubber, a multiolefin and an isoolefin are reacted at a temperature of about $-40°$ F. to about $-160°$ F. in the presence of a Friedel-Crafts catalyst such as aluminum chloride. The catalyst is ordinarily aluminum chloride in methyl chloride and the mixture of monomers, e.g. isoprene and isobutylene, contacts the catalytic solution in a tubular type of reactor at the low temperature conditions to form a slurry of butyl rubber particles in solution in a diluent which may also be methyl chloride. The slurry is then introduced into water to form a slurry of butyl rubber, generally in the form of crumbs, in the water. The rubber crumb is then removed from the slurry and dewatered on a vibrating screen or Oliver type rotary filter to about 30 to about 60% water by weight. It is further mechanically dewatered, e.g. Anderson expeller or dewatering extruder, to a water content of about 6 to about 20 wt. percent.

An Anderson expeller is a continuous mechanical screw press employing discontinuous worms on a shaft separated at intervals by collars and breaker lugs and operating within and through a barrel made up of bars separated by thin spaces. The shaft moves the material from the hopper, through the drainage barrel. As the solids move through the barrel under pressure, the liquid is pressed from the solids and permitted to escape through spaces between the bars that make up the barrel.

Thereafter, the remaining water is removed by heating. For example, the crumb is fed into a heated devolatilizing extruder equipped with a die face pelletizer. The pellets so formed are substantially free, i.e. 0.1 to 0.5 wt. percent, of water. They are then dropped into water to cool to prevent agglomeration of the pellets. The surface water is removed by heating in a drying tunnel. The pellets are then cooled and baled, under pressure, in the manner described in U.S. Pat. 3,264,387 which is incorporated herein by reference.

The baling process is generally performed at a temperature of about 140° F. to about 250° F. and a pressure of about 800 to about 3500 p.s.i.; the heat and pressure being maintained for about 5 to about 60 seconds. The resulting compacted mass has a density of about 40 to about 54 pounds per cubic foot.

Similar processes incorporating water separation and drying steps are inherent in other polymer processes. For example, styrene butadiene (GR–S) rubber is prepared as a rubber latex which is coagulated by the addition of acid or salts. The coagulated product is washed, filtered on an Oliver rotary vacuum drum filter, from which it is removed, having a water content of about 30 wt. percent and dried for about 2 hours at a maximum of 82° C. to reduce the volatile matter content (i.e. water) to about 0.5%.

It is readily evident that large space requirements and equipment costs are needed in these conventional drying operations. Additionally, in certain processes, the heating steps are either inadequate or detrimental.

For example, the shearing action and high temperature in the devolatilizing extruder, i.e. 375–500° F., results in polymers (e.g. PVC, butyl rubber) having molecular weight distributions skewed toward the low end. Consequently, it is only with great difficulty that, in preparing butyl rubber, can a polymer be prepared which has a weight average molecular weight ($\overline{M}_w$) to number average molecular weight ($\overline{M}_n$) greater than 4.0.

The halogenated butyl rubbers, especially brominated butyl rubber, for example, decompose at the drying temperatures used in the devolatilizer extruder. The result is the release of lacrimatory gases, e.g. HBr, and severe corrosion of equipment.

When polyisobutylene has been prepared and dried in a conventional manner, baled in the manner described in U.S. Pat 3,264,387 and stored for several weeks, the bales become relatively transparent. Occluded moisture becomes visible as a large white "baseball" in the center of the bale.

Though the polymer water content is only about 0.1 to about 0.8 wt. percent, and does not affect product quality, the appearance of the bale affects customer acceptance. It is desirable therefore to remove this remaining water to give a moisture-free product. Conventional drying techniques are inadequate to further reduce the water content of the polymer.

Various polymer processing techniques have been developed utilizing electronic heating. For example, metal particles have been dispersed in a vulcanizable rubber and the mix cured by induction heating at a frequency of about 1 mHz., e.g. see U.S. 3,249,658. As the name implies, induction heating operates by inducing a current in a conductor, i.e. metal filings; the heat effect depends on the eddy currents induced in the material and the heating of the rubber is by conduction from the metal filings.

Dielectric heating has been used to heat non-conductors having polar molecules. For example, polyvinyl chloride may be pressed into molding "pre-forms" and heated by dielectric heating prior to introduction into a compression mold. This heating technique relies on the polarity of the molecule to induce a heating effect. The material to be heated is placed between two plates which form a capacitance in an electronic circuit. The polarity of the plates is rapidly reversed at a frequency in the range of about 1 to about 150 mHz. Heating is caused by the rapid vibration of the polar molecules attempting to align themselves with the constantly changing field.

More recently the partial curing of natural rubber or synthetic elastomers has been accomplished by passing the material through the center of a helical metal wave guide which is connected to a microwave generator running at about 300 to about 30,000 mHz., e.g. British Pat. 1,065,971. Curing is completed by passing the material through a conventional heater.

Microwave heating, like conventional dielectric heating, is based on the principle that electromagnetic waves interact with a dielectric material, some of the energy associated with these waves being stored and some being dissipated. The heating effect is a function of the dissipated energy (dielectric loss). The dielectric loss is caused by the frictional drag associated with permanent or induced dipole orientation in the alternating electric field. Generally, polymers show an increase in dielectric loss with an increase in frequency of the radiation. Some polymers, however, e.g. PVC, actually show a decrease in dielectric loss at the higher frequencies.

Though all polymer molecules exhibit some polarity, with few exceptions, the synthetic elastomers are essentially nonpolar and hence, have a low dielectric loss. Heating of these materials is usually accomplished by the inclusion of polar materials such as fillers, i.e. carbon black.

SUMMARY OF INVENTION

It has been found that, surprisingly, the volatile matter content of essentially nonpolar polymers can be reduced to below the detectable limit of 1 p.p.m. by continuous drying in a two-step operation using microwave heating comprising a first drying step at 915 mHz. (L band) for about 10 seconds to 3 minutes to reduce the moisture content below 5 wt. percent and a second drying step of about 10 sec. to about 3 min. at 2450 mHz. (S band).

During the drying process the wet polymer is carried on a vibrating screen which is an integral part of a resonating cavity.

Surprisingly, the polymers dried by the process of this invention have improved appearance, a broader molecular weight distribution (i.e. higher $\overline{M}w/\overline{M}n$) and a higher modulus of elasticity. Further, though the polymer is thoroughly dry, it leaves the second resonating cavity only warm to the touch and requires no further cooling before baling.

DESCRIPTION OF DRAWING

The present invention will be further illustrated by reference to the drawings in which:

FIG. 1 is a flow diagram of a preferred method for carrying out the process of this invention; and FIGS. 2a, 2b and 2c are schematic diagrams of Radiation Suppressors;

FIG. 3 is an isometric detail of a resonating cavity; and

DETAILED DESCRIPTION

Figure 4:
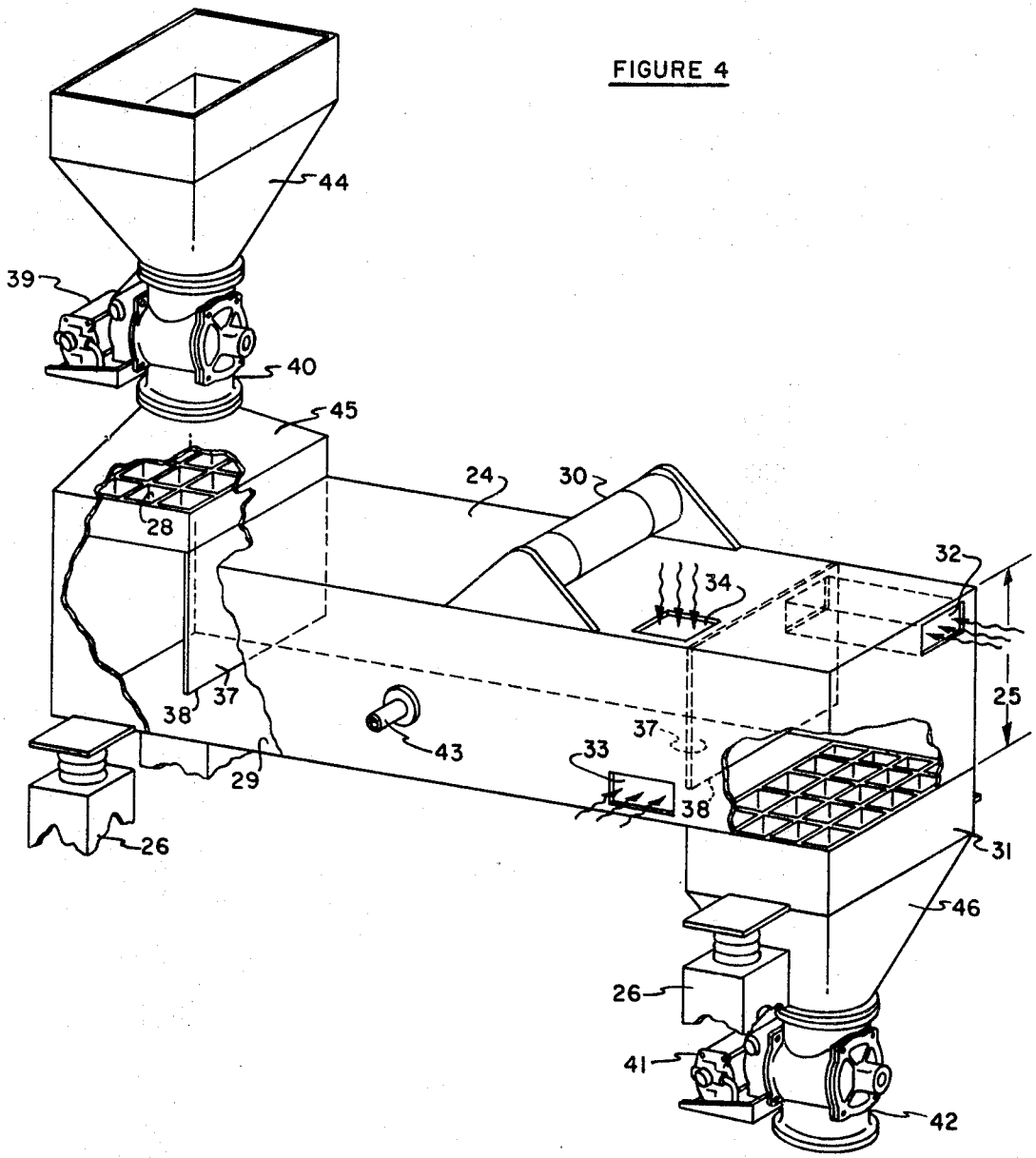
FIG. 4 is an isometric detail of a resonating cavity equipped with rotary valve seals and vacuum exhaust.

The expression "butyl rubber" as employed in the specification and claims is intended to include copolymers made from a polymerization reactant mixture having therein about 70–99.5% by weight of an isoolefin which has about 4–7 carbon atoms and about 30–0.5% by weight of a conjugated multiolefin having about 4–14 carbon atoms. The resulting copolymer contains 85–99.5% of combined isoolefin and 0.5 to 15% of combined multiolefin. The term "butyl rubber" is described in an article by R. M. Thomas et al. in Industrial Engineering and Chemistry, vol. 32, pp. 1283 et seq., October 1940.

The butyl rubber generally has a Staudinger molecular weight between about 20,000 to about 500,000; preferably about 25,000 to about 200,000; especially 45,000 to 60,000; and a Wijs iodine number of about 0.5 to about 50; preferably 1 to 15. The preperation of butyl rubber is described in U.S. Pat. 2,356,128, which is incorporated herein by reference.

The halogenated rubbery isoolefin-multiolefin-containing copolymers, particularly brominated butyl rubber, which are advantageously devolatilized and dried in accordance with the present invention, are produced by careful halogenation of the rubbery isoolefin-multiolefin copolymers in a manner which does not degrade the molecular weight thereof as more fully described hereinafter.

In order to produce halogenated butyl rubber, the halogenation is regulated so that the resulting rubber will contain about at least 0.5 wt. percent (preferably at least about 1.0 wt. percent) combined halogen, but not more than about X wt. percent combined chlorine or 3.0 X wt. percent combined bromine wherein:

$$X = \frac{M_3 L}{(100-L) M_1 + L (M_2 + M_3)}$$

and:

L = mole percent of the multiolefin in the polymer,
$M_1$ = molecular weight of the isoolefin,
$M_2$ = molecular weight of the multiolefin,
$M_3$ = atomic weight of chlorine or bromine.

Suitable halogenating agents which may be employed are gaseous chlorine, liquid bromine, alkali metal hypochlorites or hypobromites, $C_4$–$C_{10}$ tertiary alkyl hypochlorites, sulfur bromides, sulfuryl chlorides, pyridinium chloride perchloride, N-bromosuccinimide, alpha-chloroacetanilide, N,N'-dichloro-5,5-dimethyl hydantoin, iodine halides, trichlorophenolchloride, N-chloroacetamide, beta-bromo-methyl-phthalimide. Preferred halogenating agents are gaseous chlorine, liquid bromine, sulfuryl chloride, sulfuryl bromide, chlorohydantoins, bromohydantoins, iodine monochloride and related materials. The halogenation is generally conducted at temperatures above 0° to about +100° C., depending upon the particular halogenating agent, for about 1 minute to several hours. An advantageous pressure range is from about 0.1 to 1000 p.s.i.a., atmospheric pressure being satisfactory. The halogenation may be accomplished by preparing a 1 to 30 wt. percent solution of such polymers as above in a substantially inert liquid organic solvent such as $C_3$–$C_8$ substantially inert hydrocarbons or halogenated derivatives of saturated hydrocarbons, e.g. hexane, mineral spirits, cyclohexane, benzene, chlorobenzene, chloroform, carbon tetrachloride, mixtures thereof, etc. and adding thereto the halogenating agent which may optionally be dissolved in a substantially inert $C_3$–$C_{12}$ hydrocarbon, a $C_1$–$C_5$ alkyl chloride, carbon tetrachloride, carbon disulfide, etc. If chlorine gas is employed, it may also be diluted with up to about 50, preferably 0.1 to 5, times its volume of a substantially inert gas such as nitrogen, methane, carbon dioxide, etc.

The resulting halogenated isoolefin-multiolefin-containing copolymer may be recovered by precipitation with oxygenated hydrocarbons, particularly alcohols or ketones such as acetone or any other known non-solvent for the halogenated butyl rubber and dried at about 1 to 760 millimeters or higher of mercury pressure absolute, at about 0° to 180° C., preferably at about 50° to 150° C., e.g. 70° C. Other methods of recovering the chlorinated polymer are by conventional spray or drum drying techniques.

Alternately, the solution of the halogenated rubber may be injected into a vessel containing steam and/or agitated water heated to a temperature sufficient to volatilize the solvent and form an aqueous slurry of the rubber. This halogenated rubber may be separated from the slurry by filtration and recovered as a crumb. As so produced, the halogenated rubbery polymer has a Staudinger molecular weight within the range of approximately 20,000 to 500,000, preferably 25,000 to 200,000.

The term "polyisobutylene" as used in this specification is intended to mean homopolymers of isobutylene having a Staudinger molecular weight of about 60,000 to about 140,000. The particular polymerization techniques by which the polymer is made does not form an essential part of this invention.

Through GR-S type (styrene butadiene) latex is referred to in particular, it is obvious the drying technique of this invention is applicable to any latex polymerization process. The term "latex polymerization" as used in this specification includes any process in which monomers are emulsified into or suspended in a water medium during the polymerization process. The term "latex" as used in this specification includes all polymers formed by latex polymerization techniques.

The term "microwave heating" as used throughout this specification means heating with electromagnetic radiation at about 600 to about 40,000 mHz. Preferably, the microwave heating frequency is about 900 to about 30,000 mHz., more preferably about 900 to about 8600 mHz.; most preferably about 915 to about 2450 mHz.

Though application of this invention is directed primarily toward particular synthetic elastomers, it is evident that the invention disclosed herein is suitable for use in any process for making of essentially nonpolar polymer which requires a drying step to remove volatile polar solvents or water. The term "polymer" includes elastomers, plastomers, and thermoplastics. The term "essentially nonpolar" includes those materials having a dielectric loss factor of about 0.0001 to about 0.1 at the operating frequency, e.g. butyl, halogenated butyl, GR-S polymers and polyvinyl chloride.

Both meandering wave guides and resonating cavities may be used as means for exposing the material to be treated to microwave radiation. The meandering wave guide system has the disadvantage of requiring a relatively shallow bed depth. For example, in drying butyl rubber using a meandering wave guide system the depth of the butyl rubber on the conveyor belt is limited to a maximum of three inches at 915 mHz. and a maximum of ½ inch at 2450 mHz. This limitation is caused by the nature of the propagation of the electromagnetic radiation and the necessity for confining it within a hollow wave guide.

In order to best utilize the electromagnetic radiation for heating, it is necessary to pass the material to be heated through the center of the meandering wave guide since at the top and bottom of the wave guide the electric field is at its maximum while at its sides it is at its minimum. A shallow bed depth requires a relatively narrow opening in the wave guide. As the bed depth increases, the height of the opening increases up into the zone of high field intensity allowing radiation leakage and resulting in lower overall heating efficiency.

The preferred process utilizes a resonating cavity such as those described in U.S. patent application Ser. No. 674,155, now U.S. Pat. No. 3,434,220, which is incorporated herein by reference. Said application describes a resonating cavity having a conveyor belt to carry the material to be dried. The improved resonating cavity of this invention eliminates the need for a conveyor belt as such or the necessity of mode stirrers as described in that application.

In its preferred embodiment the resonating cavity is an elongated container of rectangular cross-section having side walls, top and bottom made of metallic, conducting material. As used in the specification and claims the term "metal" or "metallic" means those elements and their alloys known to be metals and conductors of electricity. Preferably the metal is stainless steel.

The resonating cavity is supplied with air inlets and outlets through which warm air is blown to prevent moisture condensation within the cavity. Where the material to be dried is coarse particulate matter e.g., polymer crumb, the bottom of the resonating cavity may be a metal screen; the warm air being blown up through the screen. The term "screen" as used in the specification and claims means both screen in the conventional sense of a woven wire fabric and a metal plate having a multiplicity of perforations therethrough. Obviously, the perforations must be of smaller diameter than the material to be dried. Preferably, the bottom of the resonating cavity is a screen, the air inlet completely encloses the screen and is of metal construction. Since the openings in the screen will be generally less than one-quarter wave length of the frequency used, there is no hazard from radiation leakage through the screen.

The material to be dried is supported on the bottom of the resonating cavity and moved along through the cavity by vibrating the entire cavity, which is preferably inclined obliquely to the horizontal. Such methods of transporting material are well known to the art and are termed "vibrating conveyors."

The means of vibrating said conveyors are well known. Preferably the conveyor is spring mounted. Methods of vibrating the conveyors include electromagnetic vibrators, air vibrators and rotary electric vibrators. The electromagnetic vibrators are essentially spring loaded solenoids which have a reciprocating motion. The air vibrators are air driven reciprocating pistons which produce an oscillation in the body to which they are attached. The rotary electric vibrators comprise an electric motor driven eccentric weight. The direction of centrifugal force on the eccentric weight changes as the center of mass revolves about its axis of rotation, thereby causing a continuing change in direction of force applied to the conveyor. The result is a vibrating motion. These various vibrating means are described in Chemical Engineer Catalog, 51 et al., pp. S120 and 1920, Rheingold, New York (1967), incorporated herein by reference. This invention is not intended to be limited by the means in which the conveyor is vibrated.

Where the material to be dried is supported by the bottom of the vibrating conveyor resonating cavity, hereinafter referred to as the "support plate," certain dimensions of the resonating cavity are critical. The height must be between one to about one-half of the wave length of the microwave frequency used in the resonating cavity. For example, at a frequency of 915 mHz. the height should be between about 6.5 to about 13 inches. At 2450 mHz. the height should be about 3 to 6 inches. The width and length of the unit is a function of the throughput and desired residence time. Residence time may be further controlled by the angle of inclination of the conveyor or by changing the frequency of vibration.

Preferably the conveyor is inclined at an angle of about 1 to about 30°, more preferably about 5 to about 20°, e.g., 10°. The residence time will be dependent on the power input (watts) and quantity and type of solvent to be removed. The residence time is readily calculated by making an energy and material balance around the conveyor unit. Ordinarily in commercial operations residence times will range between 20 seconds to about 5 minutes, more preferably about 1 to about 2 minutes, e.g., 90 seconds.

Though in its preferred embodiment the support plate is the bottom of the conveyor, it is not essential that the design be such. The support plate may be elevated about one inch to about one-quarter wave length of the microwave frequency used in the resonating cavity. In such a case, however, the support plate must be a non-conducting, nonpolar dielectric. Preferably the material should have a dielectric loss factor of less than 0.010 at the operating frequency. Illustrative of such materials are polystyrene, polypropylene, polyethylene, Teflon, Teflon-coated fiber glass, etc.

Where the support plate is elevated above the bottom surface of the cavity, the height is not critical. However, mode stirrers are necessary to insure good distribution of microwave energy. The operation and construction of these mode stirrers is described in detail in U.S.

application S.N. 674,155, now U.S. Pat. No. 3,434,220, incorporated herein by reference.

The resonating cavity vibrating conveyor may also be equipped with a hopper which itself is vibrated to promote good flow of feed material. In order to suppress radiation loss at the inlet and outlet of the conveyor radiation suppressors are required. Preferably, the suppressor is of the type known in the art as "egg crate suppressors." These suppressors are comprised of a multiplicity of metal plates at right angles to one another to form a grid pattern. The squares of the grid should have a dimension of not more than one-quarter wave length of the radiation used in the cavity. Preferably, the width of the plates (depth of the grid) should be at least one-half wave length. The thickness is not critical except for physical requirements. About 20 ml. are adequate.

The depth of material to be dried on the support plate should be about ⅛ to about 4 inches, the deeper bed depth being associated with the lower frequency. For example, at 915 mHz. the bed depth should be about 3 inches, more preferably about 2–2½ inches. At 2450 mHz. the bed depth is preferably less than one inch, e.g. one-half inch.

The process of this invention may be more readily understood by reference to the drawings. Referring now to FIG. 1, butyl rubber crumb is fed from a slurry tank discharge line 11 to a vibrating screen 12. The bulk of the water is separated from the crumb, the water being discharged through the water discharge line 13 and the crumb 14 containing about 60 wt. percent water is transferred by means of a screw conveyor 15 to an Anderson expeller 16 which reduces the water content to about 6 to about 30 wt. percent, usually about 10 to about 20 wt. percent, the water being discharged through the expeller discharge line 17. The crumb, reduced in water content, is fed from the expeller 16 to the hopper 18 of the resonating cavity vibrating conveyor 19 which has introduced into it by means of a flexible wave guide 20, electromagnetic radiation at about 915 mHz. The water content is reduced to about 5 wt. percent. Thereafter, the partially dried crumb is transferred to a second resonating cavity 21 having introduced into it by means of a wave guide 22, electromagnetic radiation at about 2450 mHz. The butyl rubber crumb discharged from the second resonating cavity 21 with a water content of less than 10 parts per million (p.p.m.), e.g. less than 1 p.p.m.

In order to prevent leakage of radiation from the cavity or between cavities, radiation suppressors are required. Preferably, these are of the egg crate type.

The resonating cavities, 19 and 21, may be two separate units equipped with inlet and outlet absorption barriers (i.e. "egg crate" barriers) or single continuous unit having located between the zones of different microwave frequency an "egg crate" type energy absorption barrier, 23. The structure of the "egg crate" type of absorption barrier may be more readily understood by reference to FIG. 2. The barrier 23 of FIG. 2a comprises a series of plates, 24, at right angles to one another to form a multiplicity of compartments having a length, 25, and a width, 26, of not more than $\lambda/4$ wherein the $\lambda$ is the wave length of the microwave frequency. The height of the "egg crate" 27 is at least $\lambda/2$.

Although the suppressor is shown in the quadrangular "egg crate" form, it is obvious that it need not have this particular configuration. For example, the suppressor may be a series of closely packed tubes not more than $\lambda/4$ in diameter and at least $\lambda/2$ long, as shown in FIG. 2b. The tubes may be spatially oriented in a circular, rectangular or square pattern. Alternately, the tubes may comprise square transition sections which transform into circular tubes as shown in FIG. 2c; the square section and the circular section having a maximum dimension of $\lambda/4$. In the latter case, the tubes would be joined at the square edges to give a grid of tubes either in a rectangular or square pattern. The term "egg crate suppressor" as used in the specification and claims shall mean a radiation suppressor having any of the aforedescribed configurations.

It will be obvious to those skilled in the art that water barriers such as those shown in U.S. patent application, S.N. 674,155, now U.S. Pat. No. 3,434,220 and U.S. Pat. No. 3,365,562, incorporated herein by reference, may be used as radiation suppressors.

The structure of the vibrating conveyor resonating cavity may be more readily understood by reference to FIG. 3 wherein the enclosure (the resonating cavity), 24, is constructed of an electrically conductive material (e.g. metal). This enclosure, 24, is about 5 to 10 feet long and about 2 to about 5 feet wide. The height, 25, must not exceed $\lambda$, the wave length of the microwave frequency being introduced into the cavity. Preferably, the height is between $\lambda/2$ and $\lambda$. The entire unit is preferably mounted on spring supports, 26.

The material to be dried is fed into the hopper, 27, and through the inlet, 28, which comprises an "egg crate" suppressor to suppress radiation losses. It falls onto the support plate, 29, and as a result of the vibrating motion generated by the vibrator, 30, is conveyed toward the outlet, 31, which comprises an "egg crate" suppressor where it is discharged. The microwave energy is preferably introduced countercurrently to the flow, that is, near the outlet. Preferably, three inlets, 32, 33 and 34 are placed at right angles to each other.

Radiation reflectors, 37, are optionally included. Where the lower edge of the reflectors, 38, is less than $\lambda/4$ from the support plate, use of other suppressors, though desirable, is not essential. It is readily evident that the inlet "egg crate" suppressor may be recessed into the cavity to form a part of the reflector.

Where the resonating cavity operates at a microwave frequency of 915 mHz., the height of the cavity is less than 13 inches and the maximum diameter of the "egg crate" suppressor openings is 3¼ inches. For 2450 mHz., the cavity height is a maximum of 5.6 inches and the suppressor openings are less than 1.4 inches.

To prevent condensation of volatiles within the enclosure, warm air is blown across the material to be dried. The air inlets, 35, and outlets, 36, being so oriented to best utilize the air flow. For example, where the material to be dried is powdery the air flow is directed across the surfaces shown. There the material to be dried is coarse, such as butyl rubber crumb; the support plate may be a wire screen through which air is blown. Alternately, a reduced pressure may be applied to the air outlets, thereby causing air to be brought up through the screen as a result of the reduced pressure. All air inlet and outlet openings have dimensions less than ¼ wave length of the radiation being used. The air temperature is preferably about 150 to 200° F.

The resonating cavity is shown having a rotary vibrator mounted thereon. However, any suitable means may be used to vibrate the cavity. It is not necessary to vibrate the entire cavity. For example, the vibrated energy may be applied directly to the support plate. The alternate location for the vibrator, 30, is shown in FIG. 3 in broken lines. The vibration frequency is preferably about 360 to about 10,000 vibrations per minute (v.p.m.) so as to penetrate the material masses, keep the particles free flowing and in an agitated state.

Although the invention is described in terms of a vibrating conveyor, it is readily evident that the same result may be accomplished by using a cavity of circular cross sections and rotating the cavity about its longitudinal axis. Where the cavity is rotated, air inlets and outlets and radiation inlets are preferably located in stationary end supports. Electrical contact must be maintained between the rotating cavity and the stationary supports by brushes or other suitable means. The diameter of the cavity should be about $\lambda$ to about $\lambda/2$. The cavity may comprise a cylindrical metal screen through which air may be drawn to prevent moisture condensation with the cavity.

The term "enclosure" as used in the specification and claims means the resonating cavity whether of rectangular or circular cross section. Since rotating a circular enclosure which is inclined has the same effect, from the material transport standpoint, as vibrating the cavity, reference to "vibrating means" or "vibrating" said enclosure as used in the specification and claims shall mean vibrating in the conventional sense as well as rotating of a circular enclosure. The "support plate" of the circular enclosure constitutes the entire circumference of the rotating circular enclosure.

The advantages of this invention may be more readily appreciated by reference to the following examples.

EXAMPLE 1

Drying of butyl rubber having an average moisture content of 20 wt. percent.

Equipment (1) Resonating cavity operating at 915 mHz. (L band)
  Cavity dimensions: width—4 ft.; length—30 ft.; height—13 inches
  Power (microwave): 450 kw. in form of 9/50 kw. power supplies. Arrangement of microwave inlets staggered at 3 ft. intervals going from wall to wall
  Air flow rate: 1500 c.f.m. at 175° F.
  Vibrating means: Rotary electric, 3600 v.p.m. Cleveland Vibrator Company Model RC–S; entire cavity spring mounted
(2) Resonating cavity operating at 2450 mHz. (S band)
  Cavity dimensions: width—4 ft.; length—15 ft.; height—5.6 inches
  Power (microwave): 90 kw. in form of 3/30 kw. power supplies arranged in similar staggered fashion as the L band cavity
  Air flow rate: 1500 c.f.m. at 160° F.
  Vibrating means: Rotary electric, 6000 v.p.m. Cleveland Vibrator Company Model RC–2.

Butyl rubber crumb leaving the Anderson expeller of the butyl rubber plant, having a water content of about 20 wt. percent is fed into the inlet hopper of the L-band cavity at a rate of about 6350 lbs./hr. (wet basis). The crumb bed height is about 3 inches. After a residence time of about 90 seconds, the crumb exited from the L-band cavity with a water content of about 5 to about 7 wt. percent.

This partially dried product is split into two streams and one of the streams is fed into the S-band cavity while the other through the conventional drying process. The depth of the bed in the S-band unit is about one-half inch. After about 25 seconds residence time within the cavity, the rubber emerges with a water content of less than 10 p.p.m. and a snow-white appearance while the conventionally dried material (volatilizing extruder) had about 0.1 wt. percent moisture and was of amber color. Production rate was about 5000 lbs./hr. of dry polymer.

EXAMPLE 2

The SS-band cavity of Example 1 was operated at 90 kw. microwave power and used to dry about 3500 lbs./hr. of wet polyisobutylene.

(A) Polyisobutylene having a water content of about 5 wt. percent was dried to a water content of less than 1 p.p.m. after a residence time in the cavity of about 25 seconds.

(B) Polyisobutylene having a water content of about 2 wt. percent was dried to a water content of less than 1 p.p.m. after a residence time in the cavity of about 10 seconds.

When the polyisobutylene of this example is baled, the bale remains clear and there is no observable indication of occluded water, i.e., white "baseballs."

EXAMPLE 3

Polyvinyl chloride containing about 18 wt. percent water was dried in an S-band (2450 mHz.) cavity similar to the unit of Example 1 utilizing 60 kw. microwave power. The resonating cavity vibrating conveyor had a width of 12 inches, a height of 5.4 inches and an air flow of about 1300 c.f.m. at 145° F. The product residence time in the unit was about 25 seconds.

The product produced at 50 lbs./hr. had a final water content of less than 1 p.p.m. Its appearance was snow-white in color and, hence, would produce a film of greater clarity than the usual off-white product.

A determination of the molecular weight (vapor phase osmometry) was made and found to be 10,000 as compared with 8,000 for the conventionally dried powder.

Though in actual practice such large quantities of water (i.e., >5 wt. percent) would be removed using both an L-band and S-band cavity in series, this laboratory experiment serves to demonstrate that, surprisingly, drying by microwave heating results in a product having improved appearance and higher molecular weight.

EXAMPLE 4

In a polypropylene process the polymer, containing about 25 wt. percent atactic polypropylene and about 13 wt. percent water, was dried in the laboratory unit of Example 3. After a residence time of about 16 seconds, the product (50 lbs./hr.) had a snow-white appearance and a water content of less than 1 p.p.m.

EXAMPLE 5

Butyl rubber crumb having a water content of about 5% was dried in the S-band cavity of Example 1 operating at 90 kw. microwave power. The crumb bed height was about 1½ inches while the air flow rate was 1400 c.f.m. at a temperature of about 145° F. A residence time of about 30 seconds reduced the water content to less than 1 p.p.m. The product (4000 lbs./hr. dry weight) was snow-white in the form of crumbs and when baled was clear rather than off-white or amber as is the conventionally dried material.

The product had a broader molecular weight distribution (i.e. $\overline{M}w/\overline{M}n=6$ vs. 4 for conventionally dried rubber). The broader molecular weight range makes for a more easily processed rubber.

The above example serves to illustrate that the drying of butyl rubber by microwave heating techniques results not only in greatly reduced drying time as anticipated but, surprisingly, produces a product having improved appearance and broader molecular weight distribution.

Although the drying technique of this invention makes possible, where necessary, to reduce the volatiles content of a polymer to below the detectable limit, e.g. <1 p.p.m., those skilled in the art are aware that in many cases it is sufficient to reduce the volatiles content, e.g. water, of synthetic polymers to less than 5000 p.p.m., more preferably about 3000 p.p.m. The advantages of this invention are still obtained where drying is suspended at these higher levels of volatiles content, e.g. 3000 p.p.m.

For example, the polymer bulk temperature under these conditions is only about 180–190° F. as compared with about 375–500° F. when conventional techniques are used for drying to these levels. As has been pointed out, the advantages obtained as a result of the lower temperatures are improved appearance, e.g. snow-white rather than off-white or amber color, and broader molecular weight distribution. Additionally, the polymers exhibit higher tensile strengths and modulus of elasticity.

Though the process has been described in terms of removing water, it is evident that it is applicable to any polymer process which requires the removal of a vehicle as long as the vehicle (water or organic solvent) is polar. The wet polymer need only be delivered as a powder, crumb or pellet to the microwave oven. The term "polar vehicle" as used in this specification and claims means water or a polar organic solvent, i.e. organic solvents with a dielectric constant greater than 4.0.

The invention has been described with particularity as a method for drying polymers. It is obvious to those skilled in the art that the process of this invention is applicable to any substance from which a polar vehicle is to be removed. Illustrative of other materials which fit into the class of "essentially nonpolar" materials as described above, which may be dried in the manner of this invention are:

(A) Food products: Shredded coconut, seeds, vegetables, fruits, tapioca, whey, gelatin, corn starch, potato starch, starch byproducts, yeast filter cake, milk solids, egg solids, coffee extract, fish livers and other livers, whole fish, fruit pulp, distillery byproducts, freeze dried coffee.

(B) Organic materials: Pharmaceuticals, blood, lignin, tanning extract, synthetic casein, sewage sludge, detergents, dyes, pigments, lithopane, cellulose acetate.

(C) Wood, paper, and fibers: Cotton linters, rayon staple, asbestos fiber, wood pulp, wool, cotton, sawdust.

(D) Inorganic salts and other inorganic materials: Fertilizers, carbon pigment, kaolin, ceramics, silica gel, alumina, zeolites, clay, cryolite, flourspar, alumina hydrate, titanium dioxide, aluminum stearate, calcium stearate, zinc stearate, white lead, mercuric oxide, magnesium carbonate, lead arsenate, gypsum, potassium persulfate, chrome green, acid treated clay, copper sulfate, barium nitrate, zinc sulfate, sodium sulfide, aluminum sulfate, manganese sulfate, magnesium chloride.

Where the material to be dried is polar, such as certain inorganic salts or certain pharmaceuticals, care must be taken to use a sufficiently short residence time within the cavity to avoid degradation of the product.

The process has been described as one operating at atmospheric pressures and elevated temperatures. The efficiency of drying with a microwave energy is a function of the power dissipated (P) as defined by the equation:

$$P = fE^2C\epsilon$$

where $f$ is the frequency in Hz., E=electric field, C=capacitance of the sample and $\epsilon$=dielectric constant.

The dielectric constant of water is inversely proportional to temperature as shown below.

| Temp., °C.: | E at $10^8$ c.p.s. |
|---|---|
| 0 | 88 |
| 20 | 80 |
| 100 | 48 |

Hence, it is obvious the coupling may be improved by removing water under vacuum at reduced temperatures. Where a vacuum is used, it is necessary to use rotary feeders at the inlet and outlet of the resonating cavity vibrating conveyor. The unit so adapted is applicable to freeze drying techniques (i.e. freeze dried coffee) wherein the material to be dried is introduced in a frozen granulated form. Where rotary feed valves are used, they will act as radiation suppressors and additional suppressors though desirable are not essential. FIG. 4 shows such a resonating cavity vibrating conveyor equipped with rotary feed valves and vacuum exhaust port. Referring now to FIG. 4, a resonating cavity vibrating conveyor similar to that shown in FIG. 3 is equipped with a vacuum exhaust port, 43, so as to permit evacuation of the cavity. In order to supply seals at the inlet and outlet of the cavity, the rotary valves are required for material feed and discharge. The rotary valve, 40, at the inlet is driven by drive motor, 39, and is mounted on a transition zone, 45. The inlet valve is equipped with a hopper, 44, to which feed material may be added. At the discharge end, drive material falls into a hopper, 46, which has mounted at its discharge end a rotary valve, 42, driven by drive motor, 41. It will be noted where a vacuum is used, the support plate, 29, must be solid and may not be a screen. The radiation suppressors, 28, are not essential where the rotary valves are used, but may be used as an added precaution to prevent radiation leakage. The vacuum exhaust port, 43, is preferably of a diameter less than one-quarter wave length of the radiation being used. Obviously, a multiplicity of ports may be used for rapid evacuation.

It will be obvious to one skilled in the art that many modifications of this invention may be made without departing from the spirit or scope thereof. It is therefore not intended that this invention be limited by the examples specifically disclosed herein.

What is claimed is:

1. A microwave resonating cavity vibrating conveyor for drying materials which comprises:
   (a) an enclosure constructed of an electrically conducting material having:
      (1) a material feed inlet,
      (2) a material feed outlet,
      (3) a bottom plate which acts as a support plate for the material to be dried, and
      (4) at least one microwave radiation inlet port, said enclosure having a height of about $\lambda/2$ to about $\lambda$ wherein $\lambda$ is the wavelength of microwaves being introduced into said cavity;
   (b) means for introducing into said enclosure microwaves at a frequency of about 600 to about 50,000 mHz.;
   (c) means for suppressing microwave radiation, said suppressing means being spacially oriented at said inlet and outlet to prevent microwave radiation from leaking out of said enclosure; and
   (d) means for vibrating said enclosure.

2. The apparatus of claim 1 wherein said enclosure is spring mounted.

3. The apparatus of claim 1 wherein said vibrating means communicate with said support plate.

4. The apparatus of claim 1 wherein said enclosure is adapted with air inlet and outlet ports, said ports having a maximum dimension of $\lambda/4$.

5. The apparatus of claim 1 wherein said support plate is a screen.

6. The apparatus of claim 1 adapted with a (1) vacuum exhaust port communicating with means for creating a vacuum in said enclosure; and (2) rotary feed valves affixed to the enclosure at the inlet and outlet ports, thereby providing pressure tight means for introducing and discharging the material to be dried from the enclosure.

7. The apparatus of claim 1 wherein said radiation suppression means is an "egg crate" suppressor.

8. A process for drying a material wetted with a polar vehicle which comprises introducing said material into at least one resonating cavity vibrating conveyor of claim 1 operating at a microwave frequency of about 600 to 50,000 mHz.; conveying said material through said cavity, utilizing the vibrating of said cavity, for a period of time sufficient to reduce the polar vehicle content of said polymer to less than 5000 p.p.m.

9. The process of claim 8 wherein said material is passed through said resonating cavity for a time sufficient to reduce the polar vehicle content of said material to less than 10 p.p.m.

10. The process of claim 8 wherein said cavity is operated at a microwave frequency of about 900 to about 30,000 mHz.

11. The process of claim 8 wherein the material to be dried is (1) fed to a first cavity operating at 915 mHz. and conveyed through said cavity for a time sufficient to reduce the polar vehicle content of said material to about 5 wt. percent and (2) feeding said partially dried material to a second cavity operating at a microwave frequency of about 2450 mHz. and conveying said material through said second cavity for a period of time sufficient to reduce the polar vehicle content of said polymer to less than 5,000 p.p.m.

12. The process of claim 8 wherein the material to be dried is a nonpolar synthetic polymer.

13. The process of claim 12 wherein said polymer is GR–S rubber, butyl rubber, halogenated rubber, polyvinyl chloride, polypropylene or polyisobutylene.

14. In a process for preparing an essentially nonpolar synthetic polymer utilizing a polar vehicle from which said synthetic polymer is separated, the improvement which comprises:
(a) transferring the synthetic polymer containing about 6 to about 30 wt. percent of polar vehicle, to a first microwave resonating cavity vibrating conveyor of claim 1 operating at a microwave frequency of 915 mHz.;
(b) conveying said polymer through said cavity for a time sufficient to reduce the vehicle content of said polymer to less than 5 wt. percent;
(c) transferring the partially dried polymer to a second microwave resonating cavity vibrating conveyor operating at a microwave frequency of 2450 mHz.; and
(d) conveying said polymer through said second conveyor for a period of time sufficient to reduce the vehicle content to less than 5,000 p.p.m.

15. The process of claim 14 wherein said polymer is conveyed through said resonating cavity for a time sufficient to reduce the polar vehicle content of said polymer to less than 10 p.p.m.

16. The process of claim 14 wherein the synthetic polymer is GR–S rubber, butyl rubber, halogenated butyl rubber, polyvinyl chloride, polypropylene or polyisobutylene.

17. In a process for preparing butyl rubber wherein a slurry of said rubber is formed in a diluent from which said rubber is separated by introducing said slurry into water, thereby forming a water slurry of butyl rubber crumb, the steps which comprise:
(a) separating the rubber crumb from the water;
(b) reducing the water content of said crumb, by mechanically dewatering, to about 6 to about 30 wt. percent;
(c) transferring the dewatered crumb to a first microwave resonating cavity vibrating conveyor of claim 1 operating at a microwave frequency of 915 mHz.;
(d) conveying said crumb through said first conveyor for a period of time sufficient to reduce the water content of the crumb to below 5 wt. percent;
(e) transferring the partially dried crumb to a second microwave resonating cavity vibrating conveyor operating at a microwave frequency of 2450 mHz.; and
(f) conveying said crumb through said conveyor for a period of time sufficient to reduce the water content below 10 p.p.m.

18. The process of claim 9 wherein the rubber is halogenated butyl rubber.

19. A process for drying polyisobutylene polymer so that it is substantially free of occluded water which comprises passing particles of polyisobutylene having an initial moisture content of less than 5 wt. percent through a microwave resonating cavity of claim 1 at a frequency of 2450 mHz. for a time sufficient to reduce the moisture content to less than 1 p.p.m.

20. The process of claim 19 wherein the initial polymer moisture content is about 0.1 to about 0.8 wt. percent.

References Cited
UNITED STATES PATENTS

| | | | |
|---|---|---|---|
| 2,500,752 | 3/1950 | Hanson et al. | 219—10.55 |
| 3,166,383 | 1/1965 | Morris | 34—164X |

WILLIAM E. WAYNER, Primary Examiner

U.S. Cl. X.R.

34—164; 219—10.55, 10.71